July 14, 1931. B. P. JOYCE 1,814,704
PACKING
Filed Oct. 22, 1928
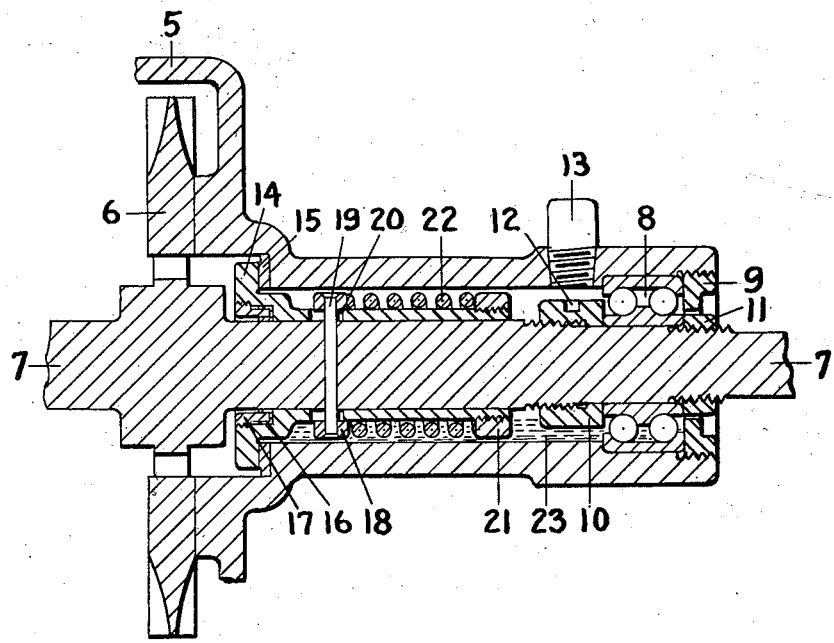
INVENTOR
Bryan P. Joyce Patented July 14, 1931

1,814,704

UNITED STATES PATENT OFFICE

BRYAN P. JOYCE, OF DAVENPORT, IOWA

PACKING

Application filed October 22, 1928. Serial No. 314,142.

My invention has reference in general, to packings, and more particularly it relates to a packing for use with rotating members.

The principal object of my invention is to provide a simple, compact and effective packing for rotating parts. Among the further objects of my invention are to provide a packing, devoid of rubber, leather and similar packing materials which might be injured by the machine fluid or lubricant, or which might injure parts of the machine; to provide a packing having but one frictional surface; to provide a packing having a minimum of parts and surface exposed to the machine fluid; and such further objects, advantages and capabilities as will hereafter appear and as are inherent in the construction disclosed herein. My invention further resides in the combination, construction and arrangement of parts illustrated in the accompanying drawing, and, while I have disclosed therein what is now considered the preferred forms of this invention, I desire it understood that the present disclosure is to be considered as illustrative only and not as limiting my invention.

In the drawing annexed hereto and forming a part hereof, the figure shows a partial longitudinal section through a rotary pump.

Referring more in detail to the annexed drawing, 5 designates the pump casing in which the impeller 6 with its shaft 7 is mounted. The outer race of the bearing 8 is clamped to the casing by the threaded ring 9, while the inner race is clamped to the shaft by the threaded rings 10 and 11, the threads of these rings being of opposite hands and of such direction, that the inertia of the parts against rotation and the frictional action of the bearing will increase their grip upon the race. The bearing 8 positions the impeller longitudinally as well as radially while in the side of the pump which is not shown, the rings 10 and 11 are omitted which permits the shaft to slide within the bearing.

The ring 10 contains a hole 12 to receive a tool through the tapped hole for the lubricant valve 13, and by rotating the shaft the position of the ring 10 upon the shaft may be adjusted.

The cylinder 14 is slidably mounted on the shaft 7 and its flange bears against the inner side of the casing wall as shown. In some instances the casing material is not suitable for a bearing and in such event a ring 15 of proper material is pressed into the casing. For such cooperating surfaces I prefer one to be of hard polished metal and the other largely of soft metal as shown in certain of my copending applications and my Patent Re. No. 16,978, May 29, 1928.

The joint between the cylinder 14 and the shaft 7 is sealed by the thin, resilient, flexible metal ring 16 which is held in place by the ring 17 threaded into the cylinder 14. The ring 16 has a light press fit both in the cylinder and on the shaft and the fit in addition to any pressure of the pump fluid insures an effective seal.

The collar 18 is slidably mounted on the cylinder 14 and the ends of the pin 19 from the shaft 7 are riveted therein. The pin 19 passes through the longitudinal slots 20 in the cylinder 14, thereby causing the cylinder to rotate with the shaft 7 but permitting longitudinal movement between them. The collar 21 is threaded on the end of the cylinder 14 and the spring 22 acting between the collars 18 and 21 presses the flange of the cylinder against its bearing 15, the strength of the spring being sufficient to overcome the friction between the ring 16 and the shaft 7, and in case of a vacuum pump, of a strength to overcome the vacuum.

The pressure between the cylinder 14 and its bearing 15 is at all times greater than any pressure of fluid within the casing and varies proportionately therewith, in accordance with the area of the bearing annulus and the area of the annulus of the cylinder 14 exposed to the casing pressure, the strength of the spring being considered.

The packing at the other side of the impeller which is not shown, is exactly similar to the one shown, therefore the push of the springs 22 are balanced. Lubricant 23 is admitted through the plug or valve 13, to lubricate both the bearing 8 and the sealing surface between 14 and 15. Centrifugal force feeds the lubricant to the sealing surface, also the springs 22 may be wound in such direction as to force the lubricant toward the sealing surface.

It has been the practice to provide stuffing boxes at each side of the rotor, then bracket to support the ball bearings, to allow space for the stuffing box adjustment. In the present invention such brackets and the adjustment space are eliminated, permitting a simple and inexpensive machine construction.

It is of course understood that the specific description of structure set forth herein may be departed from without departing from the spirit of my invention as set forth herein and expressed in the appended claims.

Having now described my invention, I claim:

1. The combination with a casing wall and a rotatable shaft extending therethrough, of a cylinder surrounding said shaft and projecting through the wall, said cylinder having a radial flange adapted to contact the inner side of the casing wall, packing at the inner end of the cylinder between the cylinder and the shaft, means adjacent the longitudinal middle of the cylinder and engaging the shaft and the cylinder, adapted to prevent rotary movement between them, and means acting between the cylinder and the first mentioned means to press the cylinder flange against the casing wall.

2. The combination with a casing wall and a rotatable shaft extending therethrough, of a metal cylinder surrounding said shaft and projecting through the wall, said cylinder having a radial flange adapted to contact the inner side of the casing wall, thin, resilient metal packing secured to the cylinder between it and the shaft, a pin from the shaft through longitudinal slots in the cylinder, a collar surrounding the cylinder and fixed to the ends of said pin, a second collar surrounding and fixed to the projecting end of the cylinder and resilient means acting between the collars to press the cylinder flange against the casing wall.

3. In a pressure fluid machine, a casing and a rotatable shaft mounted therein, means positioning the shaft longitudinally, a cylinder surrounding said shaft and having a radial flange contacting the inner side of the casing wall, packing between the cylinder and the shaft, means engaging the shaft and the cylinder to prevent rotary movement between them, means acting between the cylinder and the first mentioned means and cooperating with the machine fluid, to press the cylinder flange against the casing wall said casing including a chamber containing lubricant and said lubricant being adapted to be fed by centrifugal force to the cylinder flange contacting the wall when said shaft is rotated.

4. The combination with a casing wall and a rotatable shaft extending therethrough, of a cylinder surrounding said shaft and projecting through the wall, said cylinder having a radial flange adapted to contact the casing wall, packing between the cylinder and the shaft, a pin from the shaft through longitudinal slots in the cylinder, a collar surrounding the cylinder and fixed to the ends of said pin, a helical spring surrounding said cylinder and acting between the collar and the cylinder to press the cylinder flange against the casing wall.

5. The combination with a casing wall and a rotatable shaft extending therethrough, of a cylinder surrounding said shaft and projecting through the wall, said cylinder having a radial flange contacting the casing wall, packing between the cylinder and the shaft, means engaging the cylinder and the shaft preventing rotary movement between them but permitting longitudinal movement, resilient means acting between the cylinder and the first mentioned means to press the cylinder flange against the casing wall, said casing including a chamber surrounding said cylinder, said chamber containing lubricant and said lubricant being adapted to be fed by centrifugal force to the cylinder flange contacting the casing wall when said shaft is rotated.

6. The combination of a casing wall and a rotatable shaft extending therethrough, of a cylinder surrounding said shaft and projecting through the wall, said cylinder having a radial flange contacting the casing wall, packing between the cylinder and the shaft, means engaging the cylinder and the shaft to prevent rotary movement between them but permitting longitudinal movement, a helical spring surrounding the cylinder and acting between said means and the cylinder to press the cylinder flange against the casing wall, said casing including a chamber surrounding the cylinder and spring, said chamber containing lubricant, said lubricant being adapted to contact said spring and the spring being wound opposite to the direction of rotation of said shaft to impel said lubricant toward the contacting portions of the cylinder flange and the casing wall.

7. In a pressure fluid machine, a casing and a rotatable shaft mounted therein, a cylinder surrounding said shaft and having a radial flange contacting the inner side of the casing wall, packing between the cylinder and the shaft, means engaging the cylinder and the shaft to prevent rotary movement between them, a helical spring surrounding the cylinder, said spring cooperating with the machine fluid to press the cylinder flange against the casing wall, said casing including a chamber surrounding the cylinder and spring, lubricant within the chamber and said lubricant being adapted to be fed by centrifugal force to the cylinder flange contacting the casing wall when said shaft is rotated.

8. In a pressure fluid machine, a casing and a rotatable shaft mounted therein, a cylinder surrounding said shaft, and having a radial flange contacting the inner side of the casing wall, packing between the cylinder and the shaft, means engaging the cylinder and shaft to prevent rotary movement between them, a helical spring surrounding the cylinder, said spring cooperating with the machine fluid to press the cylinder flange against the casing wall, said casing including a chamber surrounding the cylinder and spring, lubricant within the chamber and contacting the spring and said spring being wound opposite to the direction of rotation of said shaft to impel said lubricant toward the contact of the cylinder flange with the casing wall.

In witness whereof, I hereunto subscribe my name to this specification.

BRYAN P. JOYCE.